(12) United States Patent
Graham et al.

(10) Patent No.: US 6,378,621 B1
(45) Date of Patent: Apr. 30, 2002

(54) LIFT TUBE FOR AN AGRICULTURAL IMPLEMENT FRAME

(75) Inventors: William Douglas Graham, East Moline, IL (US); Scott Charles McCartney, Davenport; William Howard Smith, Bettendorf, both of IA (US); Patrick M. Buckley; Robert Edwin Bennett, both of Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/649,319

(22) Filed: Aug. 28, 2000

(51) Int. Cl.[7] .............................................. A01B 49/00
(52) U.S. Cl. ......................................... 172/311; 111/52
(58) Field of Search ................................ 172/310, 311, 172/452, 456, 254, 574, 458, 463, 668, 675; 111/52, 57

(56) References Cited

U.S. PATENT DOCUMENTS

| 4,425,971 A | * | 1/1984 | Allen .......................... 172/311 |
| 4,586,724 A | * | 5/1986 | Sargent et al. .......... 172/311 X |
| 4,721,168 A | * | 1/1988 | Kinzenbaw .................. 172/311 |
| 5,346,019 A | | 9/1994 | Kinzenbaw et al. ........ 172/311 |

OTHER PUBLICATIONS

Internet Article entitled Model 3500 Twin–Line® Planter, http://www.kinzemfg.com/k35003.htm. no date.
Internet Article entitled Model 3600 Twin–Line® Planter, http://www.kinzemfg.com/k36003.htm. no date.
Internet Article entitled Model 3600 Twin–Line® Planter Specifications, http://www.kinzemfg.com/k3600specs.htm. no date.
Internet Article entitled Model 3500 Twin–Line® Planter Specifications, http://www.kinzemfg.com/k3500specs.htm. no date.

* cited by examiner

*Primary Examiner*—Robert E. Pezzuto

(57) ABSTRACT

A lift and rotate agricultural implement frame comprises a main frame having a lift tube and a carrier frame slidably mounted to the lift tube. The lift tube comprises a vertically extending main support tube having planar surfaces and a corrosion resistant exterior sleeve. The corrosion resistant exterior sleeve comprises corrosion resistant plates corresponding to the planar surfaces of the main support tube. Each of the plates has an interior surface and an exterior surface. At least one of the corrosion resistant plates adjoins another plate. One of the adjoining plates is provided with an overhang that extends past the exterior surface of the other plate of the pair. The plates are fillet welded to one another between the overhang and the other plate. The plates are also provided with oblong openings having oblong edges. The oblong edges are fillet welded to the main support tube to couple the sleeve to the main support tube.

13 Claims, 3 Drawing Sheets

LIFT TUBE FOR AN AGRICULTURAL IMPLEMENT FRAME

BACKGROUND OF THE INVENTION

1. Field of the Invention

The present invention is directed to a lift tube for an agricultural implement frame wherein the lift tube is covered with a sleeve of corrosion resistant material.

2. Description of the Prior Art

In recent years, the transverse working width of towed agricultural implements has increased so that the farmer can cover more area in a single pass. Although this increased transverse width has greatly increased farmer efficiency in field operations, it does present a problem in transporting the implement from one field to another, along roads and through fence gates. To overcome this transport problem, the implement needs to be folded into a more compact transport configuration.

Most relevant here, some row crop planters have been marketed with agricultural implement frames comprising a carrier frame and a main frame. The carrier frame has a transverse working position and a longitudinal transport position. The carrier frame is lifted relative to the main frame from its transverse working position and pivoted into a longitudinal transport position. In one embodiment, the carrier frame is lifted on a lift tube, see U.S. Pat. No. 5,346,019. The lift tube of this frame is provided with stainless steel corners that are welded to a main support tube. It is also known to sheath the posts with stainless steel sheets that are plug welded to the underlying tube and butt welded at the corners. Use of stainless steel is desirable to reduce corrosion. Corrosion resistance is desired to reduce wear on the nylon pads that slide up and down the tube and to maintain the desirable appearance of the tube. This is particularly true when the tube is exposed to corrosive liquids, such as liquid fertilizer.

SUMMARY OF THE INVENTION

It is an object of the present invention to provide a lift tube for a lift and rotate agricultural implement frame, wherein the lift tube is provided with a sleeve of corrosion resistant material.

It is a feature of the present invention that the sleeve is formed from stainless steel plates that are welded to one another and to the main support tube by fillet welds.

A lift and rotate agricultural implement frame comprises a main frame having a lift tube and a carrier frame slidably mounted to the lift tube, so that the carrier frame can be lifted vertically relative to the main frame. The lift tube comprises a vertically extending main support tube and a corrosion resistant exterior sleeve. The main support tube comprises a plurality of vertically extending planar surfaces. The corrosion resistant exterior sleeve comprises a plurality of vertically extending corrosion resistant plates corresponding to the planar surfaces of the main support tube. Each of the plates has an interior surface adjoining the corresponding planar surface of the main support tube and an exterior surface that adjoins a bearing plate mounted to the carrier frame. At least one of the corrosion resistant plates adjoins another plate. One of the adjoining plates is provided with an overhang that extends past the exterior surface of the other plate. The plates are fillet welded to one another between the overhang and the other plate.

In the illustrated embodiment, the main support tube is square and has four planar surfaces. Similarly the sleeve is also square and formed from four vertically extending plates. Each of the plates has an overhang extending over an adjacent plate. A fillet weld is made between the overhang and the adjacent plate to join the plates together. The plates are also provided with oblong openings having oblong edges. The oblong edges are fillet welded to the main support tube to couple the sleeve to the main support tube.

The square main support tube could also be encased by a sleeve having two plates. Both plates could be bent at ninety degrees with the first plate overhanging the second plate at one corner and the second plate overhanging the first plate at the opposite corner. It is also possible to form the sleeve from one plate having three ninety degree bends. With one plate, one of the vertical edges of the plate would overhang the other vertical edge and the vertical edges would be fillet welded to one another.

The welds joining the sleeve to the main support tube is removed from the bearing area. This reduces the amount of weld spatter that needs to be removed to prevent damage to the nylon bearing pads. At the corners, fillet welds are easier to make than butt welds. Fillet welds can be made by seam tracking with a robotic welder. In addition, fillet welds are more tolerant of variations in sheet width than butt welding.

DETAILED DESCRIPTION

Figure 1:
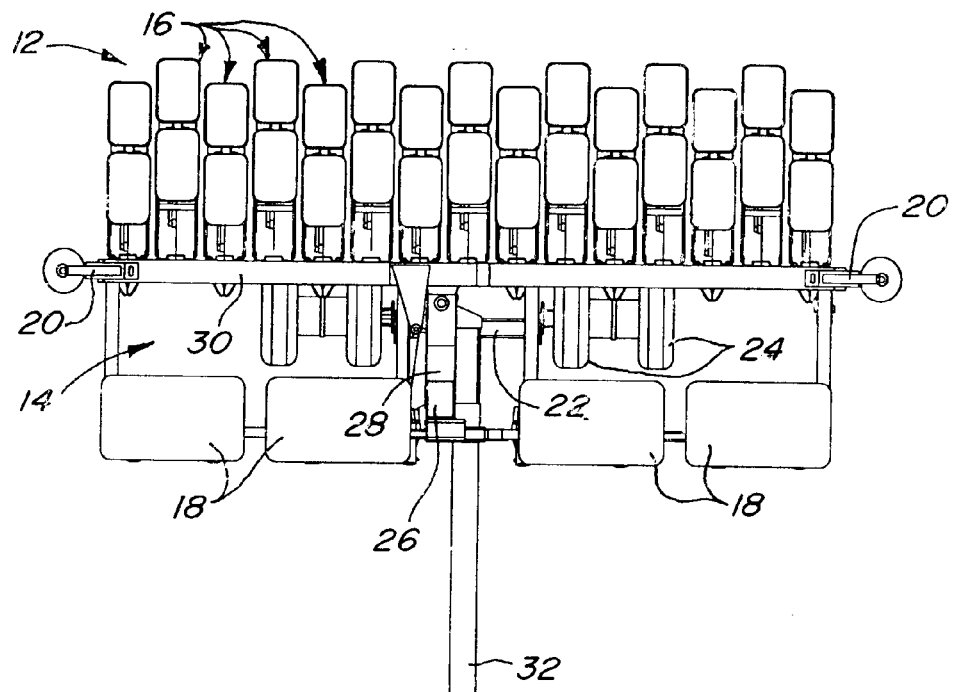
FIG. 1 is a top view of a row crop planter having an agricultural implement frame in its working configuration together with a pulling tractor.
Figure 1:
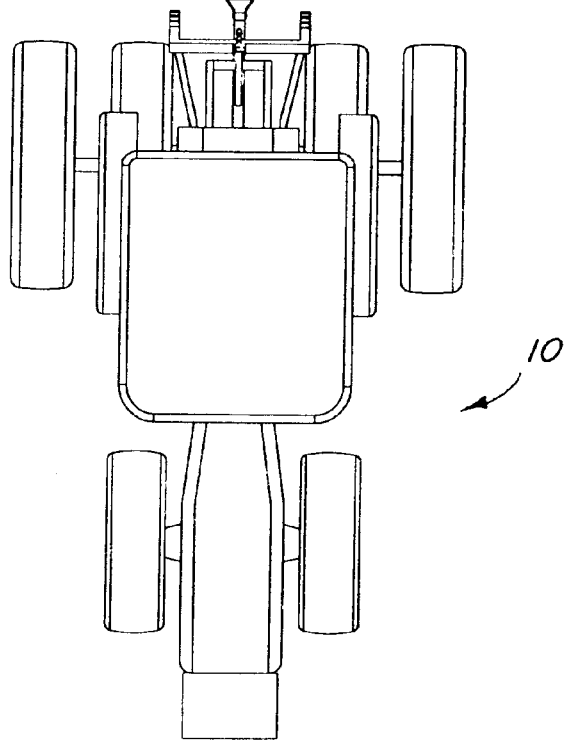
Figure 2:
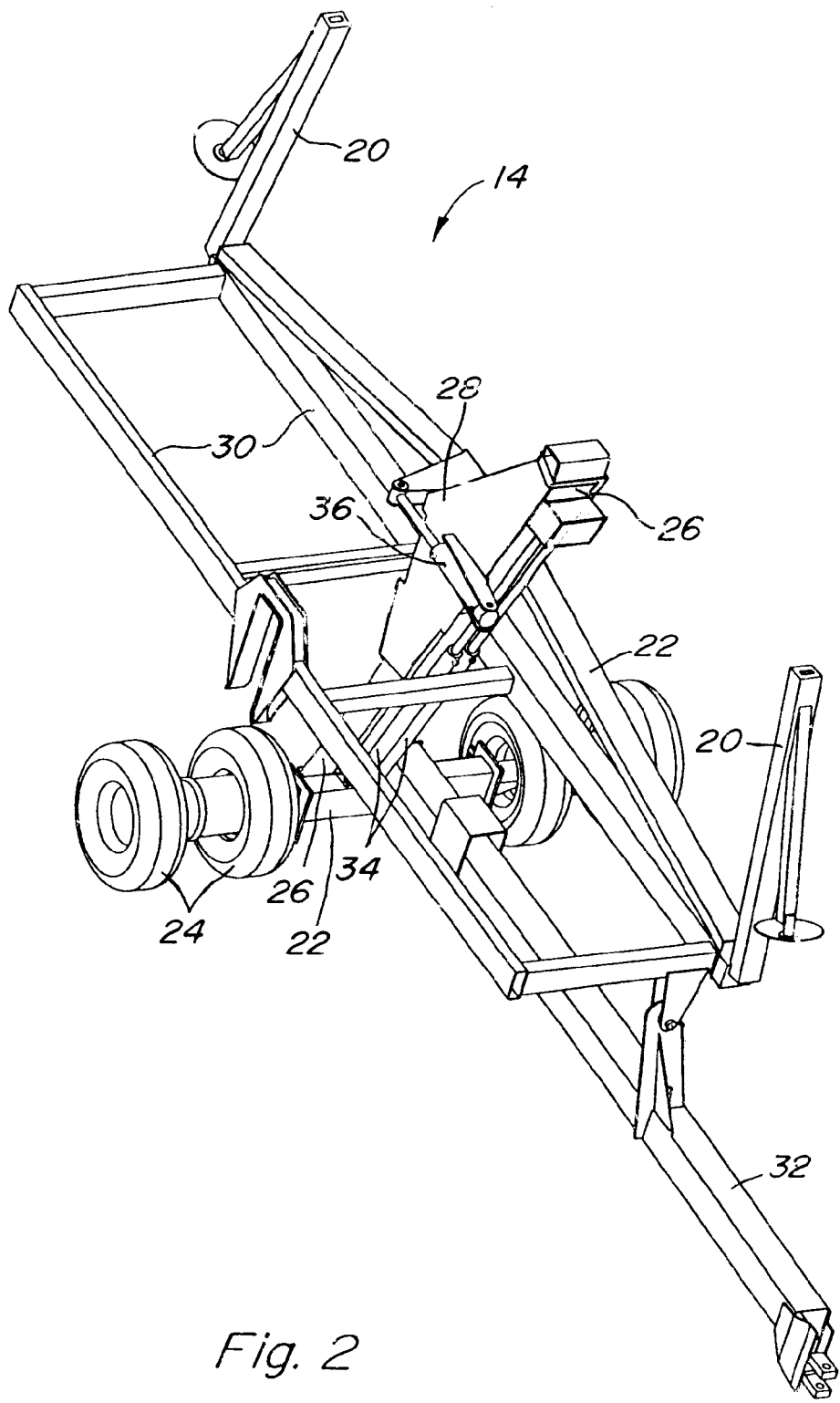
FIG. 2 is a perspective view of the agricultural implement frame of the present invention in its transport configuration with the row crop planting units and fertilizer hoppers removed for illustration purposes.
Figure 5:
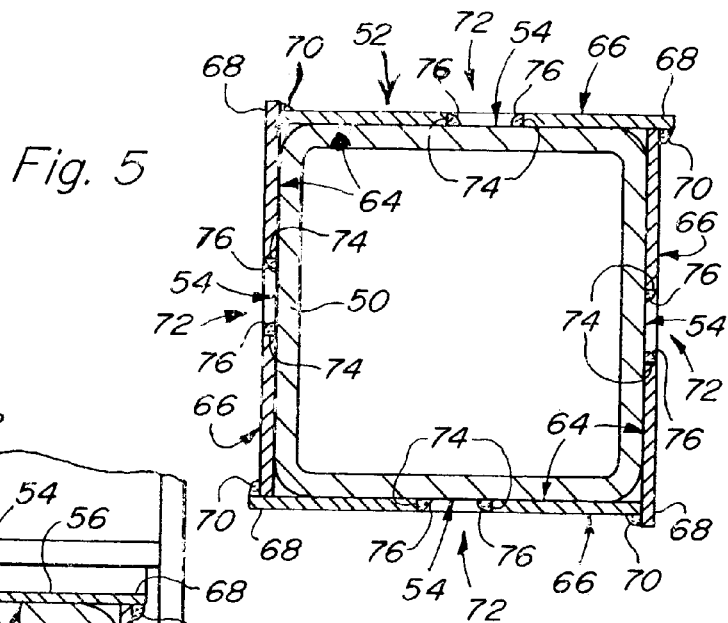
FIG. 5 is a cross sectional top view of the lift tube.

As illustrated in FIG. 1 a tractor 10 is pulling a row crop planter 12. The row crop planter comprises an agricultural implement frame 14 to which are mounted row crop planting units 16, fertilizer hoppers 18 and row markers 20. Although the present invention is illustrated in a row crop planter application, it may also be used in other agricultural applications, such as with air seeders, grain drills, tillage tools, chemical applicators and others.

The agricultural implement frame 14 comprises a main frame 22 having ground engaging wheels 24, a lift tube 26 extending upwardly and forwardly from the main frame, a truck 28 slidably mounted on the lift tube 26 and a carrier frame 30 pivotally mounted on the truck 28. The row crop planting units 16, fertilizer hoppers 18 and row markers 20 are mounted to the carrier frame. The main frame 22 is coupled to the tractor 10 by a hitch 32 extending forwardly from the main frame 22. The hitch 32 may comprise a telescoping hitch which is extended when the agricultural implement frame is in its working configuration and retracted when the frame is in its transport configuration. The truck 28 slidably moves up and down on the lift tube 26 in response to hydraulic lift cylinders 34. When the truck 28 and associated carrier frame 30 are in their raised position relative to the main frame 22, the carrier frame 30 can be pivoted relative to the truck about a vertical pivot axis by hydraulic pivot cylinder 36. Although the present invention is illustrated as being used on an implement frame 14 in which the lift tube 26 is stationary with respect to the main frame 22, the present invention could also be used on an implement frame 14 where the lift tube 26 pivots relative to the main frame 22.

The lift tube 26 comprises a main support tube 50 and a corrosion resistant sleeve 52. The main support tube 50 has a square cross section with a plurality of planar surfaces 54. In the illustrated embodiment, the sleeve 52 comprises a first plate 56, a second plate 58, a third plate 60 and a fourth plate 62. Each plate 56, 58, 60 and 62 corresponding to one of the four planar surfaces 54 of the main support tube 50. Each of the plates has an interior surface 64 adjacent to the corresponding planar surface 54 and an exterior surface 66. All of the plates 56, 58, 60 and 62 have an overhang 68 that extends past the exterior surface 66 of one of the adjacent plates.

In the illustrated embodiment, the overhang 68 of the first plate 56 extends past the exterior surface 66 of the second plate 58; the overhang 68 of the second plate 58 extends past the exterior surface 66 of the third plate 60; the overhang 68 of the third plate 60 extends past the exterior surface 66 of the fourth plate 62; and the overhang 68 of the fourth plate 62 comes full circle and extends past the exterior surface 66 of the first plate 56. The overhang 68 of the plates 56, 58, 60 and 62 and the plate it extends past are welded to one another by a fillet weld 70.

Each of the plates is provided with oblong openings 72 each having an oblong edge 74. These openings 72 pass through the plates 56, 58, 60 and 62 so that the oblong edges 74 can be welded to the corresponding planar surfaces 54 of the main support tube 50 by fillet welds 76. After this fillet welding has been completed, these welds 76 are ground to flush with the exterior surface 66 of the corresponding plate 56, 58, 60 and 62.

The plates are made of corrosion resistant stainless steel and the fillet welds 70 and 76 are robotically welded with stainless steel wire.

Figure 4:
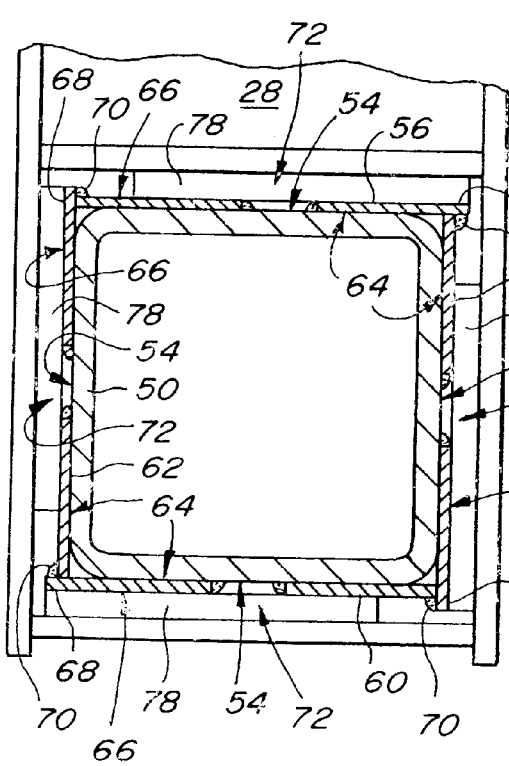
FIG. 4 is a partial cross sectional top view of the lift tube and truck.
Figure 3:
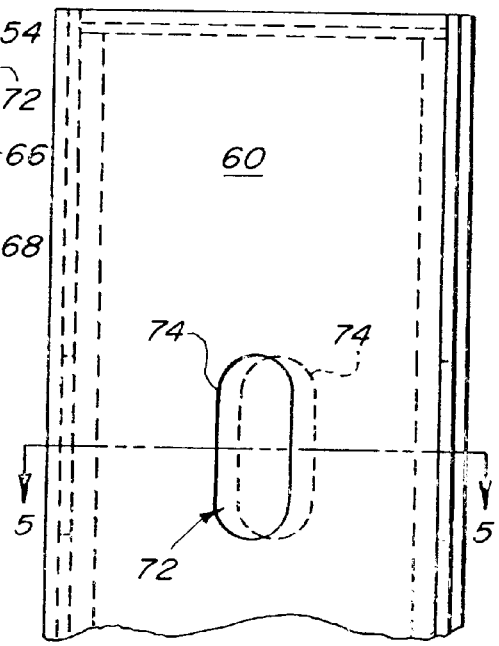
FIG. 3 is a partial side view of the lift tube.

As illustrated in FIG. 4, the truck 28 of the carrier frame 30 is mounted on the lift tube 26. Nylon bearing pads 78 are positioned between the exterior surface 66 of the plates and the truck 28. The bearing pads 78 do not extend to the fillet welds 70 of the overhangs 68. In the illustrated embodiment, the bearing pads 78 are mounted to the truck so that the bearing pads slide along the stainless steel exterior surfaces 66.

The present invention should not be limited by the above-described embodiments, but should be limited solely by the claims that follow.

Assignment

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

We claim:

1. An agricultural implement frame comprising:
   a main frame having a forwardly extending hitch and supporting wheels;
   a lift tube extending upwardly from the main frame, the lift tube having a main support tube and a corrosion resistant sleeve encasing the main support tube, the main support tube is provided with a plurality of vertically extending planar surfaces, the sleeve is provided with a plurality of plates that correspond to the planar surfaces of the main tube, the plates have an exterior surface and an interior surface, the planar surfaces of the main support tube adjoining the interior surface of the corresponding plate, a first plate is provided with an overhang that extends beyond the exterior surface of a second plate, the second plate being adjacent to the first plate, a fillet weld between the overhang of the first plate and the second plate secures the first plate to the second plate;
   a carrier frame slidably mounted on the lift tube, the carrier frame can be pivoted on a vertical pivot between a longitudinal transport position and a transverse working position.

2. An agricultural implement frame as defined by claim 1 wherein the plates are provided with openings having edges, the edges are fillet welded to the planar surfaces.

3. An agricultural implement frame as defined by claim 2 wherein the corrosion resistant plates are stainless steel.

4. An agricultural implement frame as defined by claim 3 wherein the main support tube has four planar surfaces and the covering comprises four stainless steel plates.

5. An agricultural implement frame as defined by claim 4 wherein the openings are oblong.

6. An agricultural implement frame as defined by claim 5 wherein bearing plates are positioned between the carrier frame and the exterior surfaces of the stainless steel plates.

7. An agricultural implement frame as defined by claim 6 wherein the fillet welds are made with stainless steel wire.

8. A lift tube for the main frame of an agricultural implement having a carrier frame that can be lifted and rotated, the lift tube comprising:
   a main support tube, the main support tube is provided with a plurality of vertically extending planar surfaces;
   a corrosion resistant sleeve encasing the main support tube, the sleeve is provided with plurality of plates that correspond to the planar surfaces of the main tube, the plates have an exterior surface and a interior surface, the planar surfaces of the main support tube adjoining the interior surface of the corresponding plate, a first plate is provided with an overhang that extends beyond the exterior surface of a second plate, the second plate being adjacent to the first plate, a fillet weld between the overhang of the first plate and the second plate secures the first plate to the second plate.

9. A lift tube as defined by claim 8 wherein the plates are provided with openings having edges, the edges are fillet welded to the planar surfaces.

10. A lift tube as defined by claim 9 wherein the corrosion resistant plates are stainless steel.

11. A lift tube as defined by claim 10 wherein the main support tube has four planar surfaces and the sleeve comprises four stainless steel plates.

12. A lift tube as defined by claim 11 wherein the openings are oblong.

13. A lift tube as defined by claim 12 wherein the fillet welds are made with stainless steel wire.

* * * * *